United States Patent
Kerr et al.

(10) Patent No.: US 11,673,654 B2
(45) Date of Patent: Jun. 13, 2023

(54) LANDING GEAR CONTROL

(71) Applicant: AIRBUS OPERATIONS LIMITED, Bristol (GB)

(72) Inventors: Sean Kerr, Bristol (GB); David Marles, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 403 days.

(21) Appl. No.: 16/799,920

(22) Filed: Feb. 25, 2020

(65) Prior Publication Data
US 2020/0277043 A1 Sep. 3, 2020

(30) Foreign Application Priority Data
Feb. 28, 2019 (GB) .................................... 1902725

(51) Int. Cl.
*B64C 25/26* (2006.01)
(52) U.S. Cl.
CPC .................................. *B64C 25/26* (2013.01)
(58) Field of Classification Search
CPC ................................ B64C 25/26; B64C 25/28
See application file for complete search history.

(56) References Cited

U.S. PATENT DOCUMENTS

| 2,552,843 | A | 5/1951 | Clifton et al. |
| 6,854,689 | B1 | 2/2005 | Lindahl et al. |
| 7,475,849 | B2 | 1/2009 | Lindahl et al. |
| 9,517,837 | B2 | 12/2016 | Lecourtier |
| 2008/0251637 | A1 | 10/2008 | Reynes |
| 2012/0097792 | A1 | 4/2012 | Ernis et al. |
| 2013/0026291 | A1* | 1/2013 | Way .................. B64C 25/16 244/102 R |

(Continued)

FOREIGN PATENT DOCUMENTS

| EP | 1 718 525 | 11/2006 |
| EP | 3 486 177 | 5/2019 |

(Continued)

OTHER PUBLICATIONS

Combined Search and Examination Report for GB Application No. 1902725.9 dated Aug. 13, 2019, 5 pages.

(Continued)

*Primary Examiner* — Joshua J Michener
*Assistant Examiner* — Ashesh Dangol
(74) *Attorney, Agent, or Firm* — Nixon & Vanderhye P.C.

(57) ABSTRACT

An aircraft control system 100 operably connected to a landing gear and a landing gear bay door of an aircraft 400. The system includes: a user interface 10 to receive manual inputs of first and second requests and a landing gear controller 20 configured to: receive a first indication indicative of user-operation of the user interface to input the first request, and to initiate movement of the landing gear bay door from a closed position to an open position on the basis of the first indication without initiating movement of the landing gear between an extended position and a retracted position; and receive a second indication indicative of user-operation of the user interface to input the second request, and to initiate movement of the landing gear between the extended position and the retracted position on the basis of the second indication.

13 Claims, 2 Drawing Sheets

(56) References Cited

U.S. PATENT DOCUMENTS

| | | | |
|---|---|---|---|
| 2019/0152589 A1* | 5/2019 | Evans | B64C 13/42 |
| 2019/0263511 A1* | 8/2019 | Plude | B64C 25/28 |
| 2020/0055592 A1* | 2/2020 | Rowlands | B64C 25/16 |

FOREIGN PATENT DOCUMENTS

| | | |
|---|---|---|
| WO | 2005/077757 | 8/2005 |
| WO | 2018158255 | 9/2018 |

OTHER PUBLICATIONS

European Search Report cited in EP 20159481.9 dated Jul. 23, 2020, 9 pages.
European Search Report cited in EP 20159481.9 dated Dec. 9, 2022, 6 pages.

* cited by examiner

LANDING GEAR CONTROL

RELATED APPLICATION

This application claims priority to United Kingdom Patent application GB 1902725.9, filed Feb. 28, 2019, the entirety of which is incorporated by reference.

TECHNICAL FIELD

The present invention relates to control of aircraft landing gear, and particularly to aircraft control systems comprising landing gear controllers, to landing gear control systems for aircraft, and to methods of operating landing gear controllers of aircraft.

BACKGROUND

In some known aircraft, a landing gear is held in an extended position when the aircraft is on the ground and is stowed at a retracted position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. A landing gear bay door may at least partially cover the landing gear bay when closed, and may be openable to enable movement of the landing gear between the retracted position and the extended position. Movement of the landing gear and the landing gear bay door is typically controlled by a pilot using cockpit flight controls of the aircraft, such as a landing gear control lever.

SUMMARY

A first aspect of the present invention provides an aircraft control system configured to be operably connected to at least one landing gear and at least one landing gear bay door of an aircraft, wherein the aircraft control system comprises: a user interface operable by a user to manually input first and second requests; and a landing gear controller communicatively coupled to the user interface and configured, in use, to: receive, from the user interface, a first indication indicative of user-operation of the user interface to input the first request, and to initiate movement of the landing gear bay door from a closed position to an open position on the basis of the first indication without initiating movement of the landing gear between an extended position and a retracted position; and receive, from the user interface, a second indication indicative of user-operation of the user interface to input the second request, and to initiate movement of the landing gear between the extended position and the retracted position on the basis of the second indication.

Herein, the term: "between an extended position and a retracted position" is to be interpreted as covering both "from an extended position to a retracted position" and "from a retracted position to an extended position".

Optionally, the landing gear controller is configured, in use, to initiate movement of the landing gear from the extended position to the retracted position on the basis of the second indication.

Optionally, the aircraft control system is configured to determine when the aircraft is off the ground.

Optionally, the user interface is operable to manually input the second request only when the aircraft control system has determined that the aircraft is off the ground.

Optionally, a mechanical lock prevents the user from manually inputting the second request when the aircraft control system has determined that the aircraft is on the ground.

Optionally, the user interface is operable to manually input the first request only when the aircraft control system has determined that the aircraft is off the ground.

Optionally, a mechanical lock prevents the user from manually inputting the first request when the aircraft control system has determined that the aircraft is on the ground.

Optionally, the aircraft control system being configured to determine when the aircraft is off the ground comprises the landing gear controller being configured to receive a signal indicative of the aircraft being off the ground and to determine that the aircraft is off the ground on the basis of the signal.

Optionally, the aircraft control system comprises at least one sensor for sensing whether the aircraft is off the ground, and the sensor is configured to send the signal to the landing gear controller when the sensor senses that the aircraft is off the ground.

Optionally, the landing gear controller is configured, in use, to control the user interface so that the user interface is operable by a user to manually input the first request only when the landing gear controller has determined that the aircraft has a first predetermined status.

Optionally, the landing gear controller is configured, in use, to unlock a mechanical lock to permit the user operating the user interface to manually input the first request when the landing gear controller has determined that the aircraft has the first predetermined status.

Optionally, the first predetermined status comprises one or more of: the aircraft travelling at greater than a predetermined groundspeed, the aircraft being at greater than a predetermined angle of rotation, the aircraft being off the ground, and the aircraft having a positive rate of climb.

Optionally, the landing gear controller is configured, in use, to control the user interface so that the user interface is operable by a user to manually input the second request only when the landing gear controller has determined that the aircraft has a second predetermined status.

Optionally, the landing gear controller is configured, in use, to unlock a mechanical lock to permit the user operating the user interface to manually input the second request when the landing gear controller has determined that the aircraft has the second predetermined status.

Optionally, the second predetermined status comprises one or more of: the aircraft travelling at greater than a predetermined groundspeed, the aircraft being at greater than a predetermined angle of rotation, the aircraft being off the ground, and the aircraft having a positive rate of climb.

Optionally, the user interface is mechanically changeable by the user, the first request comprises the user mechanically changing the user interface from a first state to a second state, and the second request comprises the user mechanically changing the user interface from the second state to a third state.

Optionally, the third state is different from the first state.

Optionally, the user interface comprises a cockpit flight control.

Optionally, the user interface comprises a user-movable device, and the first, second and third states are first, second and third positions, respectively, of the user-movable device.

Optionally, the user-movable device comprises a lever, such as a landing gear control lever. Optionally, the user-movable device comprises a device other than a lever, such as a switch, a button, a dial, and a knob.

Optionally, the user interface comprises two user-movable devices, and the first, second and third states are first, second and third permutations of positions of the two user-movable devices.

Optionally, the landing gear controller is configured, in use, to initiate movement of the landing gear between the extended position and the retracted position and then to initiate movement of the landing gear bay door from the open position to the closed position, on the basis of the second indication.

A second aspect of the present invention provides a method of operating a landing gear controller of an aircraft, the method comprising: receiving, from a user interface, a first indication indicative of user-input of a request to open a landing gear bay door; then causing the landing gear bay door to move from a closed position to an open position on the basis of the first indication; then receiving, from the user interface, a second indication indicative of user-input of a request to move a landing gear; and then causing the landing gear to move between an extended position and a retracted position on the basis of the second indication.

Optionally, the causing the landing gear to move between the extended position and the retracted position comprises causing the landing gear to move from the extended position to the retracted position.

A third aspect of the present invention provides a landing gear control system, comprising: one or more landing gear bay door actuators for moving a landing gear bay door from a closed position to an open position, wherein the landing gear bay door at least partially covers a landing gear bay when in the closed position; one or more landing gear actuators for moving a landing gear between an extended position and a retracted position, wherein the landing gear is at least partially positioned in the landing gear bay when in the retracted position; a cockpit flight control via which a user is able to generate a first command to move the landing gear bay door from the closed position to the open position, and a second command to move the landing gear between the extended position and the retracted position; and a landing gear controller for receiving the first and second commands from the cockpit flight control, and configured, in use, to: cause the one or more landing gear bay door actuators to move the landing gear bay door from the closed position to the open position without also causing the one or more landing gear actuators to move the landing gear between the extended position and the retracted position, in dependence on the first command; and cause the one or more landing gear actuators to move the landing gear between the extended position and the retracted position, in dependence on the second command.

Optionally, the one or more landing gear actuators are for moving the landing gear from the extended position to the retracted position, the second command is to move the landing gear from the extended position to the retracted position, and the landing gear controller is configured, in use, to cause the one or more landing gear actuators to move the landing gear from the extended position to the retracted position in dependence on the second command.

A fourth aspect of the present invention provides an aircraft comprising the aircraft control system according to the first aspect of the present invention or the landing gear control system according to the third aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
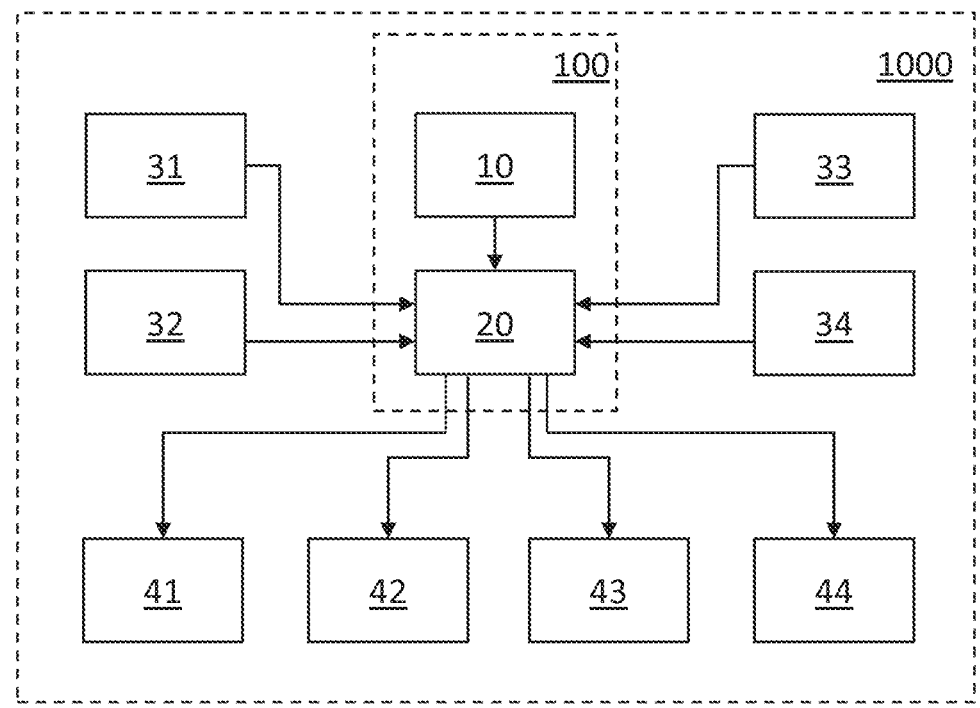
FIG. 1 is a schematic view of an example of a landing gear control system.

Landing gear can influence aircraft performance. In the extended position, the landing gear may increase aircraft drag, which can reduce the climb rate of the aircraft during take-off, and may increase aircraft noise, which can be disturbing to people on the ground in the vicinity of the aircraft. Similar effects can result from a landing gear bay door being in an open position.

Typically, movements of each landing gear and associated landing gear bay door are initiated by a pilot manually operating cockpit flight controls, such as a landing gear control lever. Typically, operation of the cockpit flight controls causes one or more landing gear bay door actuators to drive movement of the landing gear bay door from a closed position to an open position, then one or more landing gear actuators to extend or retract the landing gear, and then the one or more landing gear bay door actuators to drive movement of the landing gear bay door from the open position to the closed position. During a take-off procedure, the pilot will typically manually initiate a landing gear retraction procedure upon confirming a positive rate of aircraft climb. Such confirmation may occur at about three seconds after take-off. Since the take-off procedure is one of the highest workload flight phases for flight crew, there is a tendency for retraction of landing gear to be delayed after take-off, in order to spread the various actions that the flight crew must perform during take-off over a greater period of time. Similarly, since the landing procedure is also one of the highest workload flight phases for flight crew, there is a tendency for extension of landing gear to be performed well before landing, in order to spread the various actions that the flight crew must perform during landing over a greater period of time.

Some examples discussed herein are concerned with enabling landing gear retraction to occur sooner after take-off, in particular since this could help to reduce aircraft drag. In turn, this may enable an increased aircraft climb rate to help avoid obstacles on the ground and/or may allow an increase in maximum take-off weight of the aircraft for a given size of landing gear system, wing capability and engine thrust. Similarly, enabling landing gear retraction to occur sooner in a take-off procedure can help to reduce the total aircraft noise caused during a take-off procedure, or at least reduce a period of time during which the aircraft is making increased noise due to extended landing gear.

Some examples discussed herein are concerned with enabling landing gear extension to occur closer to landing, in particular since this could help to reduce aircraft drag and noise, or at least reduce a period of time during which the aircraft is making increased noise due to extended landing gear.

Decreasing the time for which the landing gear is extended can also reduce the risk of the landing gear being damaged, such as by buffeting by wind. These and other advantages are achievable while maintaining that authority for retracting or extending the landing gear lies with the pilot or another human operator.

FIG. 1 shows a schematic view of an example of a landing gear control system. The landing gear control system 1000 comprises an aircraft control system 100, one or more landing gear bay door actuators 41, one or more landing gear bay door locks 42, one or more landing gear actuators 43, one or more landing gear locks 44, and a plurality of sensors 31-34. Each of these elements is described below in more detail.

The one or more landing gear bay door actuators 41 are for moving a landing gear bay door (not shown) from a closed position to an open position. The landing gear bay door is associated with a landing gear (not shown) and a landing gear bay (not shown). The landing gear bay door at least partially covers the landing gear bay when in the closed position. This way, the landing gear bay door helps to protect the landing gear bay, and the landing gear when stowed in the bay, from debris that might be thrown towards the bay while the aircraft is moving on the ground or in flight. Each of the one or more landing gear bay door actuators 41 may take any suitable form, such as a hydraulic actuator, an electro-hydraulic actuator, or an electric actuator. The one or more landing gear bay door actuators 41 may also be for moving the landing gear bay door from the open position to the closed position, or an alternative mechanism may be provided for such closure.

The one or more landing gear bay door locks 42 are for locking the landing gear bay door in the closed position. Each of the one or more landing gear bay door locks 42 may take any suitable form, such as a hydraulically-actuated lock, an electro-hydraulically-actuated lock, or an electrically-actuated lock. In some cases, the one or more landing gear bay door locks 42 may be omitted. For example, the landing gear bay door may be held in the closed position by the one or more landing gear bay door actuators 41.

The one or more landing gear actuators 43 are for moving the landing gear from an extended position to a retracted position. The landing gear is at least partially positioned in the landing gear bay when in the retracted position. Each of the one or more landing gear actuators 43 may take any suitable form, such as a hydraulic actuator, an electro-hydraulic actuator, or an electric actuator. The one or more landing gear actuators 43 may additionally or alternatively be for moving the landing gear from the retracted position to the extended position, or an alternative mechanism may be provided for extension.

The one or more landing gear locks 44 are for locking the landing gear in position when retracted. Each of the one or more landing gear locks 44 may take any suitable form, such as a hydraulically-actuated lock, an electro-hydraulically-actuated lock, or an electrically-actuated lock. In some cases, the one or more landing gear locks 44 may be omitted. For example, the landing gear may be held in the retracted position by the one or more landing gear actuators 43.

The aircraft control system 100 comprises a user interface 10 and a landing gear controller 20 that is communicatively coupled to the user interface 10. The aircraft control system 100 is operably connected to the landing gear and the landing gear bay door, in this example by way of the actuators and locks 41-44. The user interface 10 is operable by a user, such as a pilot of the aircraft, to manually input respective requests for moving the landing gear bay door and the landing gear. Preferably, the user interface 10 is a cockpit flight control.

The user interface 10 may take any suitable form, such as a user-movable device, a touchpad, a touchscreen, a gesture-operable device, a voice-operable device, or any combination thereof. Such a user-movable device may comprise a lever, such as a landing gear control lever. Alternatively, the user-movable device may comprise a device other than a lever, such as a switch, a button, a dial, a knob, or the like. Further discussion of example user-movable devices is given below.

The user interface 10 is operable by a user to manually input first and second requests. The first request comprises a request to move the landing gear bay door from the closed position to the open position. The second request comprises a request to move the landing gear from the extended position to the retracted position. The first and second requests are separate requests that are temporally spaced from each other. The second request follows the first request, so that the second request is subsequent to the first request. Preferably, the user interface 10 is operable by the user to manually input the first request independently of the second request, and then to subsequently input the second request.

The controller 20 is configured, in use, to receive, from the user interface 10 (directly or indirectly), a first indication indicative of user-operation of the user interface 10 to input the first request. That is, the user interface 10 is configured to send the first indication to the controller 20 (directly or indirectly). The first indication may, for example, be an electrical or electronic signal. The controller 20 is configured to initiate movement of the landing gear bay door from the closed position to the open position on the basis of the first indication, without initiating movement of the landing gear from the extended position to the retracted position. This door opening process can take one of many forms.

In some examples, the door opening process comprises the controller 20 causing the one or more landing gear bay door actuators 41 to actuate to move the landing gear bay door from the closed position to the open position. In some examples, in which the one or more landing gear bay door locks 42 are provided, the door opening process comprises the controller 20 causing the one or more landing gear bay door locks 42 to unlock the landing gear bay door beforehand. In some examples, the door opening process comprises the controller 20 causing the one or more landing gear bay door actuators 41 to actuate to move the landing gear bay door slightly further from the open position beforehand, to facilitate unlocking of the lock(s) 42. In some examples, the controller 20 may be configured to cause the unlocking of the lock(s) 42, and optionally the slight movement of the landing gear bay door, before the door opening process is initiated and on the basis of one or more other criteria and/or inputs.

In some examples, the landing gear bay door may be moveable from the closed position to the open position under the influence of gravity alone. In some such examples, the door opening process may comprise the controller 20 causing the one or more landing gear bay door locks 42 to unlock the landing gear bay door, so that the landing gear bay door is free to open, without the controller 20 causing the one or more landing gear bay door actuators 41 to actuate to move the landing gear bay door from the closed position to the open position.

In some examples, the controller 20 may cause one or more landing gear bay door locking devices (not shown) to subsequently lock the landing gear bay door in the open position. In some examples, the one or more landing gear bay door actuators 41 may additionally or alternatively hold the landing gear bay door in the open position.

Similarly to the above, the controller 20 is configured, in use, to receive, from the user interface 10 (directly or indirectly), a second indication indicative of user-operation of the user interface 10 to input the second request. That is, the user interface 10 is configured to send the second indication to the controller 20 (directly or indirectly). The second indication may, for example, be an electrical or electronic signal. The controller 20 is configured to initiate movement of the landing gear from the extended position to the retracted position on the basis of the second indication. This landing gear retraction process can take one of many forms.

In some examples, the landing gear retraction process comprises the controller 20 causing the one or more landing gear actuators 43 to actuate to move the landing gear from the extended position to the retracted position. In some examples, in which one or more landing gear locking devices (not shown) are provided, the landing gear retraction process comprises the controller 20 causing the one or more landing gear locking devices to unlock the landing gear beforehand. In some examples, the controller 20 may be configured to cause the unlocking of the locking device(s) before the landing gear retraction process is initiated and on the basis of one or more other criteria and/or inputs.

In some examples, the controller 20 may cause the one or more landing gear locks 44 to subsequently lock the landing gear in the retracted position. In some examples, the one or more landing gear actuators 43 may additionally or alternatively hold the landing gear in the retracted position.

In some examples, the controller 20 may be configured to initiate movement of the landing gear from the extended position to the retracted position, and then to initiate movement of the landing gear bay door from the open position to the closed position, on the basis of the second indication. For example, the controller 20 may cause the one or more landing gear bay door actuators 41 to move the landing gear bay door from the open position to the closed position. Thereafter, the controller 20 may cause the one or more landing gear bay door locks 42 to lock the landing gear bay door in the closed position. In some examples, the one or more landing gear bay door actuators 41 may additionally or alternatively hold the landing gear bay door in the closed position.

The user's manual input of the first request via the user interface 10 may be considered to be the user generating a first command to move the landing gear bay door from the closed position to the open position. The controller 20 is configured, in use, to cause the landing gear bay door to move from the closed position to the open position, such as by causing suitable actuation of the one or more landing gear bay door actuators 41, without also causing the one or more landing gear actuators 43 to move the landing gear between the extended position and the retracted position, in dependence on the first command.

The user's manual input of the second request via the user interface 10 may be considered to be the user generating a second command to move the landing gear from the extended position to the retracted position. The controller 20 is configured, in use, to cause the one or more landing gear actuators 43 to move the landing gear from the extended position to the retracted position, in dependence on the second command.

Movement of a landing gear bay door from a closed position to an open position typically takes in the order of three to ten seconds, such as between three and five seconds, for example three or five seconds. Moreover, as mentioned above, during a take-off procedure, the pilot will conventionally initiate a landing gear retraction procedure only upon confirming a positive rate of aircraft climb, and such confirmation may occur at about three seconds after take-off. Therefore, conventionally, about six or more seconds elapse after take-off before the landing gear begins to be retracted.

However, systems described herein enable the user, such as a pilot, to manually input the first request before a positive rate of climb is confirmed. Accordingly, movement of the landing gear bay door from the closed position to the open position may be initiated sooner, such as before take-off, on take-off, or immediately after take-off. Therefore, subsequent movement of the landing gear from the extended position to the retracted position, following the user's manual input of the second command, may also be initiated sooner after take-off, for example in the order of three seconds sooner. This helps to provide the benefits of drag and noise reduction described above. Moreover, as these movements occur as a result of express, positive manual actions of the user, rather than automatically during a take-off procedure, the user retains authority for operating the landing gear. For example, the user still is able to wait until a positive rate of aircraft climb has been confirmed, before inputting the second request via the user interface 10 to cause landing gear retraction.

In the above example, retraction of landing gear is discussed. However, in other examples, the second request comprises a request to move the landing gear from the retracted position to the extended position, rather than a request to move the landing gear from the extended position to the retracted position. The controller 20 is then configured to initiate movement of the landing gear from the retracted position to the extended position on the basis of the second indication that the controller 20 receives (directly or indirectly) from the user interface 10. That is, the user's manual input of the second request via the user interface 10 may be considered to be the user generating a second command to move the landing gear from the retracted position to the extended position. The controller 20 may then be configured, in use, to cause the one or more landing gear actuators 43 to move the landing gear from the retracted position to the extended position, in dependence on the second command.

In some examples, the controller 20 may be configured to initiate movement of the landing gear from the retracted position to the extended position, and then to initiate movement of the landing gear bay door from the open position to the closed position, on the basis of the second indication. This may be performed in a manner similar to that discussed above for the retraction process.

Systems described herein enable the user, such as a pilot, to manually cause movement of the landing gear bay door from the closed position to the open position earlier before landing. Therefore, subsequent movement of the landing gear from the retracted position to the extended position, following the user's manual input of the second command, may be initiated closer to landing. This helps to provide the benefits of drag and noise reduction described above. Moreover, as these movements occur as a result of express, positive manual actions of the user, rather than automatically during a landing procedure, the user retains authority for operating the landing gear.

The aircraft control system 100 may be configured to determine when the aircraft is off the ground. For example, the controller 20 may be configured to receive a signal indicative of the aircraft being off the ground and to determine that the aircraft is off the ground on the basis of the signal. The aircraft control system 100 may comprise at least one sensor 33 for sensing whether the aircraft is off the ground, and the or each sensor 33 may be configured to send the signal to the controller 20 when the sensor 33 senses that the aircraft is off the ground. Example such sensors 33 are sensors for sensing landing gear strut extension, sensors for sensing landing gear wheel speed or torque, and sensors for sensing height of the aircraft above the ground (such as proximity sensors or altitude meters). Other suitable sensors will be apparent to the skilled reader.

The user interface 10 may be operable to manually input the second request only when the aircraft control system 100 has determined that the aircraft is off the ground. This may prevent inadvertent retraction of the landing gear before the aircraft is airborne. For example, when the user interface 10 comprises a user-movable device, a mechanical lock, such as a baulk solenoid, may prevent the user from manually moving the device to input the second request when the aircraft control system 100 has determined that the aircraft is on the ground. Alternatively, when the user interface 10 comprises a touchpad or touchscreen, the region of the touchpad or touchscreen that the user must touch to input the second request may be visible or activatable only when the aircraft control system 100 has determined that the aircraft is off the ground.

In some examples, the user interface 10 may be operable to manually input the first request only when the aircraft control system 100 has determined that the aircraft is off the ground. This may, for example, prevent inadvertent opening of the landing gear bay door when the aircraft is undergoing maintenance, or when the aircraft is moving on the ground and there is a risk of debris being thrown towards the bay and/or the door. For example, when the user interface 10 comprises a user-movable device, a mechanical lock, such as a baulk solenoid, may prevent the user from manually moving the device to input the first request when the aircraft control system 100 has determined that the aircraft is on the ground. Alternatively, when the user interface 10 comprises a touchpad or touchscreen, the region of the touchpad or touchscreen that the user must touch to input the first request may be visible or activatable only when the aircraft control system 100 has determined that the aircraft is off the ground.

In some examples, the controller 20 is configured, in use, to control the user interface 10 so that the user interface 10 is operable by a user to manually input the first request only when the controller 20 has determined that the aircraft has a first predetermined status. Similarly, in some examples, the controller 20 is configured to control the user interface 10 so that the user interface 10 is operable by a user to manually input the second request only when the controller 20 has determined that the aircraft has a second predetermined status. For example, it may be the controller 20 itself that is configured to make an appropriate region of a touchpad or touchscreen operable, or to unlock the mechanical lock, to permit the user operating the user interface to manually input the first or second request when the controller 20 has determined that the aircraft has the first or second predetermined status, respectively. Therefore, the controller 20 may be configured to prevent premature opening of the landing gear bay door or retraction of the landing gear until such time as it is deemed appropriate to do so, such as from a safety perspective.

The first or second predetermined status may, for example, comprise any one or more of: the aircraft travelling at greater than a predetermined groundspeed, the aircraft being at greater than a predetermined angle of rotation, the aircraft being off the ground, and the aircraft having a positive rate of climb. The controller 20 may determine that the aircraft is travelling at greater than a predetermined groundspeed on the basis of a signal received from a groundspeed sensor 31, for example. The controller 20 may determine that the aircraft is at greater than a predetermined angle of rotation on the basis of a signal received from an inclinometer 32, for example. The controller 20 may determine that the aircraft is off the ground on the basis of a signal received from one of the suitable sensors 33 discussed elsewhere herein, for example. The controller 20 may determine that the aircraft has a positive rate of climb on the basis of a signal received from an altimeter 34, for example. These sensors 31-34 may be respective parts of the landing gear control system 1000, as shown in FIG. 1. In other examples, the sensor 31 and/or the sensor 32 and/or the sensor 33 and/or the sensor 34 may be omitted from the system 1000.

Figure 2:
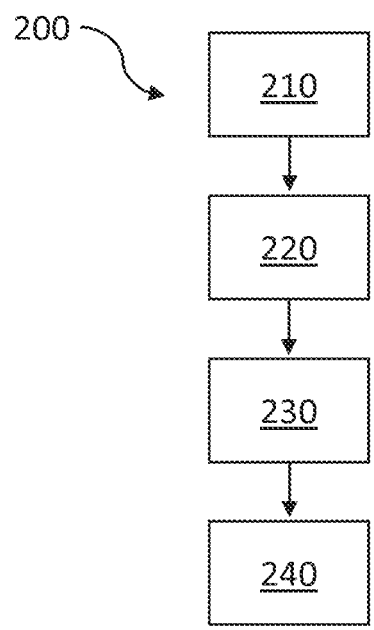
FIG. 2 is a flow diagram showing an example of a method of operating a landing gear controller of an aircraft.

FIG. 2 is a flow diagram showing an example of a method of operating a landing gear controller of an aircraft. The method 200 comprises: receiving 210, from a user interface, a first indication indicative of user-input of a request to open a landing gear bay door, then causing 220 the landing gear bay door to move from a closed position to an open position on the basis of the first indication. The method 200 also comprises subsequently receiving 230, from the user interface, a second indication indicative of user-input of a request to move a landing gear, and then causing 240 the landing gear to move between an extended position and a retracted position on the basis of the second indication.

It is to be noted that the receiving 230 of the second indication may occur after the landing gear bay door has reached the open position, or may occur after the landing gear bay door has moved from the closed position but has not yet reached the open position. In the latter case, the causing 240 of the landing gear to move between the extended position and the retracted position may commence after the landing gear bay door has reached the open position, or may commence after the landing gear bay door has moved from the closed position but still has not yet reached the open position.

The method 200 may be performed by the landing gear controller 20 discussed herein. The user interface may be the user interface 10 discussed herein.

The user interface 10 may be mechanically changeable by the user. The first request may comprise the user mechanically changing the user interface 10 from a first state to a second state, and the second request may comprise the user mechanically changing the user interface 10 from the second state to a third state. Preferably the third state is different from the first state, so that it can be discerned (preferably by sight) which of the first and third states the user interface 10 is in.

In some examples, the user interface 10 comprises two user-input devices (of any of the sorts discussed elsewhere herein, for example): one for inputting the first request and the other for inputting the second request. The user-input devices may be first and second user-movable devices that each take the same form (such as a pair of levers), or a combination of two different forms of user-movable devices (such as a button and a lever). The mechanically changing the user interface 10 from the first state to the second state may comprise the user moving the first user-movable device (for example, pressing a button mounted on a lever), and the mechanically changing the user interface 10 from the second state to the third state may comprise the user moving the second user-movable device (for example, moving the lever on which the button is mounted). That is, the first, second and third states may be first, second and third permutations of positions of the two user-movable devices.

Alternatively, the user interface 10 may comprise a single user-movable device (of any of the sorts discussed elsewhere herein, for example), and the first, second and third states may be first, second and third positions, respectively, of the single user-movable device. For example, FIGS. 3(*a*) to 3(*g*) are schematic views showing respective examples of first, second and third positions of a single user-movable device in the form of a lever, and more specifically a landing gear control lever. For the avoidance of doubt, the straight arrows in FIGS. 3(*a*) to 3(*g*) may depict linear movement of the lever or pivotal movement of the lever or a combination of the linear and pivotal movements.

Figures 3A, 3B, 3C, 3D:
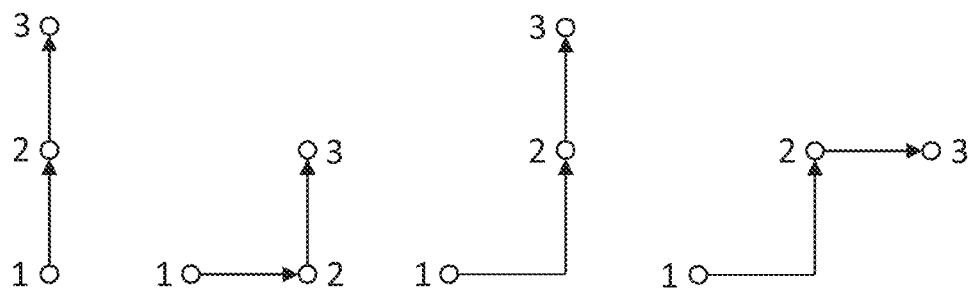
FIGS. 3a to 3g are schematic views showing respective examples of first, second and third positions of a landing gear control lever.
Figures 3E, 3F, 3G:
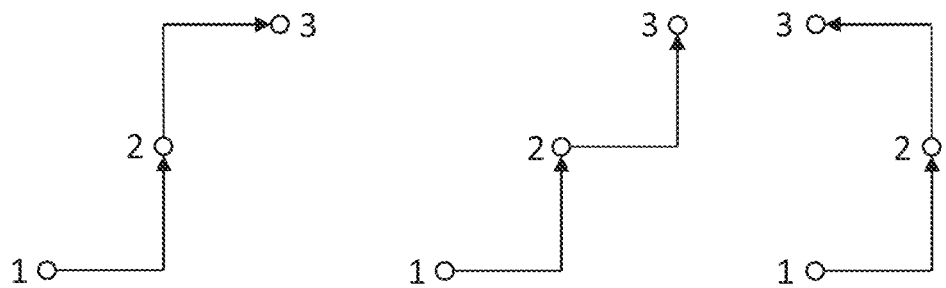

In FIG. 3(*a*), it can be seen that movement of the lever from the first position to the second position comprises moving the lever in a first direction (e.g. up), and movement of the lever from the second position to the third position also comprises moving the lever in the same direction. In FIG. 3(*b*), movement of the lever from the first position to the second position comprises moving the lever in a first direction (e.g. towards the user), and movement of the lever from the second position to the third position comprises moving the lever in a second different direction (e.g. up). In FIG. 3(*c*), movement of the lever from the first position to the second position comprises first moving the lever in a first direction (e.g. towards the user) and then moving the lever in a second direction (e.g. up), and movement of the lever from the second position to the third position comprises moving the lever again in the second direction. In FIG. 3(*d*), movement of the lever from the first position to the second position comprises first moving the lever in a first direction (e.g. towards the user) and then moving the lever in a second direction (e.g. up), and movement of the lever from the second position to the third position comprises moving the lever again in the first direction.

In FIG. 3(*e*), movement of the lever from the first position to the second position comprises first moving the lever in a first direction (e.g. towards the user) and then moving the lever in a second direction (e.g. up), and movement of the lever from the second position to the third position comprises moving the lever again in the second direction and then again in the first direction. In FIG. 3(*f*), movement of the lever from the first position to the second position comprises first moving the lever in a first direction (e.g. towards the user) and then moving the lever in a second direction (e.g. up), and movement of the lever from the second position to the third position comprises moving the lever again in the first direction and then again in the second direction. In FIG. 3(*g*), movement of the lever from the first position to the second position comprises first moving the lever in a first direction (e.g. towards the user) and then moving the lever in a second direction (e.g. up), and movement of the lever from the second position to the third position comprises moving the lever again in the second direction and then in a direction opposite to the first direction (e.g. away from the user).

It will be appreciated that the possible movements depicted in FIGS. 3(*a*) to 3(*g*) are just some examples of movements that could be employed. Other movement combinations will be apparent to the skilled reader on reading this disclosure.

Requiring the lever to be moved in a two different successive directions to reach the first position better ensures that the user will not inadvertently move the lever to the second position, and thus inadvertently prematurely requesting opening of the landing gear bay door. Requiring the lever to be moved in a certain direction to reach the second position (to input the first request) and then in a different direction to reach the third position (to input the second request) better ensures that the user will not inadvertently move the lever all the way from the first position to the third position without stopping at the second position, and thus inadvertently prematurely requesting movement of the landing gear.

Moreover, a first locking mechanism such as a baulk solenoid (e.g. under the control of the controller 20 or the system 1000 more broadly) may prevent the user from being able to move the lever from the first position to the second position until the first predetermined status is met (as discussed above). Similarly, a second locking mechanism such as a baulk solenoid (e.g. under the control of the controller 20 or the system 1000 more broadly) may prevent the user from being able to move the lever from the second position to the third position until the second predetermined status is met (again, as discussed above). Such locking mechanisms may prevent a user from inadvertently moving the lever, and thus inadvertently prematurely requesting opening of the landing gear bay door and movement of the landing gear, respectively.

Figure 4:
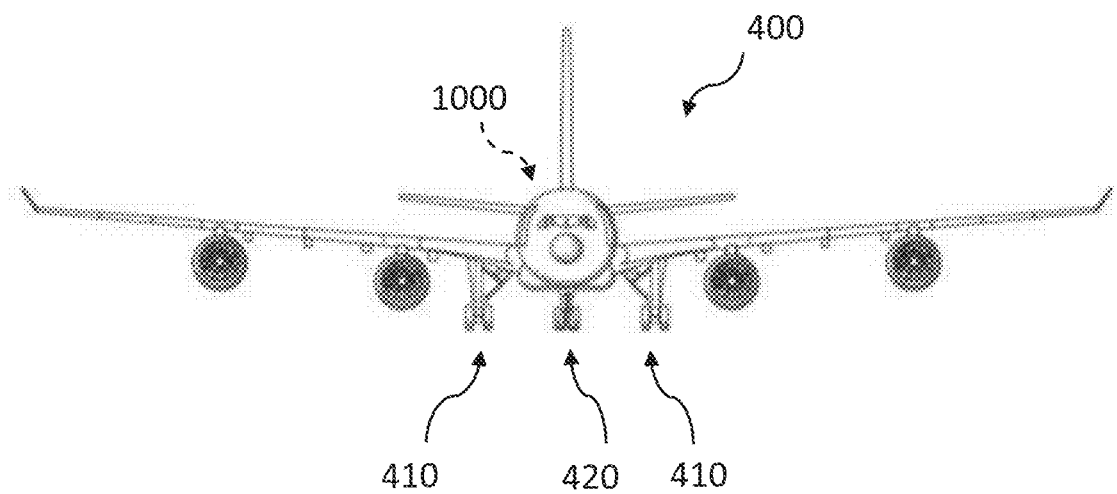
FIG. 4 is a schematic front view of an example of an aircraft.

FIG. 4 is a schematic front view of an aircraft 400. The aircraft 400 comprises two main landing gears 410 and a nose landing gear 420. The aircraft 400 also comprises a landing gear control system 1000 as discussed herein, such as the system 1000 discussed herein with reference to FIG. 1. The aircraft control system 100 of the landing gear control system 1000 may be operatively connected to all of the landing gears 410, 420 or just to one or some of the landing gears, such as the main landing gears 410. Further discussion will be omitted for brevity, but in short it will be appreciated that a user, such as a pilot of the aircraft 400, would be able to control the landing gear(s) and landing gear bay door(s) to which the system 1000 is operatively connected according to the principles discussed herein.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An aircraft control system configured to be operably connected to at least one landing gear and at least one landing gear bay door of an aircraft, wherein the aircraft control system comprises:
 a user interface operable by a user to manually input a first request and a second request, wherein the user interface is mechanically changeable by the user, and
 the first request comprises the user mechanically changing the user interface from a first position to a second position, and
 the second request comprises the user mechanically changing the user interface from the second position to a third position, and a landing gear controller communicatively coupled to the user interface and configured to:

receive, from the user interface, a first indication indicative of user-operation of the user interface to input the first request, and to initiate movement of the landing gear bay door from a closed position to an open position on the basis of the first indication without initiating movement of the landing gear between an extended position and a retracted position; and receive, from the user interface, a second indication indicative of user-operation of the user interface to input the second request, and to initiate movement of the landing gear between the extended position and the retracted position on the basis of the second indication.

2. The aircraft control system according to claim 1, wherein the landing gear controller is configured to initiate movement of the landing gear from the extended position to the retracted position on the basis of the second indication.

3. The aircraft control system according to claim 1, wherein the aircraft control system is configured to determine when the aircraft is off the ground.

4. The aircraft control system according to claim 3, wherein the user interface is operable to manually input the second request only when the aircraft control system has determined that the aircraft is off the ground.

5. The aircraft control system according to claim 3, wherein the user interface is operable to manually input the first request only when the aircraft control system has determined that the aircraft is off the ground.

6. The aircraft control system according to claim 3, wherein the aircraft control system configured to determine when the aircraft is off the ground comprises the landing gear controller being configured to receive a signal indicative of the aircraft being off the ground and to determine that the aircraft is off the ground on the basis of the signal.

7. The aircraft control system according to claim 6, wherein the landing gear controller is configured to control the user interface so that the user interface is operable by the user to manually input the first request only when the landing gear controller has determined that the aircraft has a first predetermined status.

8. The aircraft control system according to claim 7, wherein the first predetermined status comprises one or more of:
    the aircraft travelling at greater than a predetermined groundspeed,
    the aircraft being at greater than a predetermined angle of rotation,
    the aircraft being off the ground, and
    the aircraft having a positive rate of climb.

9. The aircraft control system according to claim 6, wherein the landing gear controller is configured to control the user interface so that the user interface is operable by the user to manually input the second request only when the landing gear controller has determined that the aircraft has a second predetermined status.

10. The aircraft control system according to claim 9, wherein the second predetermined status comprises one or more of:
    the aircraft travelling at greater than a predetermined groundspeed,
    the aircraft being at greater than a predetermined angle of rotation,
    the aircraft being off the ground, and
    the aircraft having a positive rate of climb.

11. The aircraft control system according to claim 1, wherein the landing gear controller is configured to initiate movement of the landing gear between the extended position and the retracted position and then to initiate movement of the landing gear bay door from the open position to the closed position, on the basis of the second indication.

12. A method of operating a landing gear controller of an aircraft, the method comprising:

receiving, from a user interface, a first indication indicative of user-input of a request to open a landing gear bay door, wherein the first indication comprises the user manually moving the user interface from a first position to a second position;

causing the landing gear bay door to move from a closed position to an open position on the basis of the first indication;

receiving, from the user interface, a second indication indicative of user-input of a request to move a landing gear, wherein the second indication comprises the user manually moving the user interface from the second position to a third position; and causing the landing gear to move between an extended position and a retracted position on the basis of the second indication.

13. A landing gear control system comprising:

one or more landing gear bay door actuators for moving a landing gear bay door from a closed position to an open position, wherein the landing gear bay door at least partially covers a landing gear bay when in the closed position;

one or more landing gear actuators for moving a landing gear between an extended position and a retracted position, wherein the landing gear is at least partially positioned in the landing gear bay when in the retracted position;

a cockpit flight control via which a user is able to generate a first command to move the landing gear bay door from the closed position to the open position, and a second command to move the landing gear between the extended position and the retracted position, wherein the first command comprises the user moving the cockpit flight control from a first position to a second position, and the second command comprises the user moving the cockpit flight control from the second position to a third position; and a landing gear controller for receiving the first and second commands from the cockpit flight control, and configured to:

cause the one or more landing gear bay door actuators to move the landing gear bay door from the closed position to the open position without also causing the one or more landing gear actuators to move the landing gear between the extended position and the retracted position, depending on the first command; and cause the one or more landing gear actuators to move the landing gear between the extended position and the retracted position, depending on the second command.

* * * * *